(12) United States Patent
Yu et al.

(10) Patent No.: US 8,103,273 B2
(45) Date of Patent: Jan. 24, 2012

(54) CELL SEARCH DEVICE OF CELLULAR SYSTEM USING OFDMA SCHEME AND METHOD THEREOF

(75) Inventors: Chang-Wahn Yu, Daejeon (KR); Youn-Ok Park, Daejeon (KR)

(73) Assignees: Samsung Electronics., Ltd., Suwon-si (KR); Electronics and Telecommunications Research Institute, Daejeon (KR); KT Corporation, Seongnam-si (KR); SK Telecom Co., Ltd., Seoul (KR); KT Freetel Co., Ltd., Seoul (KR); Hanaro Telecom, Inc., Seoul (KR)

( * ) Notice: Subject to any disclaimer, the term of this patent is extended or adjusted under 35 U.S.C. 154(b) by 1261 days.

(21) Appl. No.: 11/721,153

(22) PCT Filed: Nov. 30, 2005

(86) PCT No.: PCT/KR2005/004066
§ 371 (c)(1),
(2), (4) Date: Jun. 7, 2007

(87) PCT Pub. No.: WO2006/062308
PCT Pub. Date: Jun. 15, 2006

(65) Prior Publication Data
US 2010/0216459 A1    Aug. 26, 2010

(30) Foreign Application Priority Data

Dec. 11, 2004 (KR) .......... 10-2004-0104644
Apr. 27, 2005 (KR) .......... 10-2005-0035008

(51) Int. Cl.
*H04W 36/00* (2009.01)
(52) U.S. Cl. ......... 455/434; 455/447; 370/208; 370/209
(58) Field of Classification Search .................. 455/434, 455/446, 447; 370/208, 503, 203, 343, 342, 370/430, 479, 350, 328, 260, 209
See application file for complete search history.

(56) References Cited

U.S. PATENT DOCUMENTS

| 7,580,400 B2 * | 8/2009 | Sung et al. ............ 370/342 |
| 2003/0095516 A1 | 5/2003 | Ok et al. |
| 2003/0119444 A1 | 6/2003 | Yamaguchi |
| 2006/0098752 A1 * | 5/2006 | Song et al. ............ 375/260 |

FOREIGN PATENT DOCUMENTS

| KR | 10-2001-0055966 A1 | 7/2001 |
| WO | 2004/049618 A1 | 6/2004 |

* cited by examiner

*Primary Examiner* — Cong Tran
(74) *Attorney, Agent, or Firm* — Jefferson IP Law, LLP

(57) ABSTRACT

A cell search device using an appropriate preamble for a downlink of a cellular system using an orthogonal frequency division multiplexing access (OFDMA) scheme and a method thereof is disclosed. The cell search device for a terminal of a cellular system using an orthogonal frequency division multiplexing access scheme includes when the terminal receives a preamble symbol from a base station, a PN code and phase delay estimating unit for generating a code with the received preamble symbol and a combination of a PN code and a Walsh code, calculating a correlation value therebetween using a differential demodulation for the codes to detect the PN code, a plurality of Walsh codes, and an error of a time delay, and estimating a component of a phase delay for the time delay; and a Walsh code estimating unit for minimizing the influence of the time error using the phase delay and the PN code information obtained by the differential demodulation of the PN code and phase delay estimating unit and estimating a Walsh code for the corresponding cell by synchronization demodulation.

9 Claims, 4 Drawing Sheets

[Fig. 1]
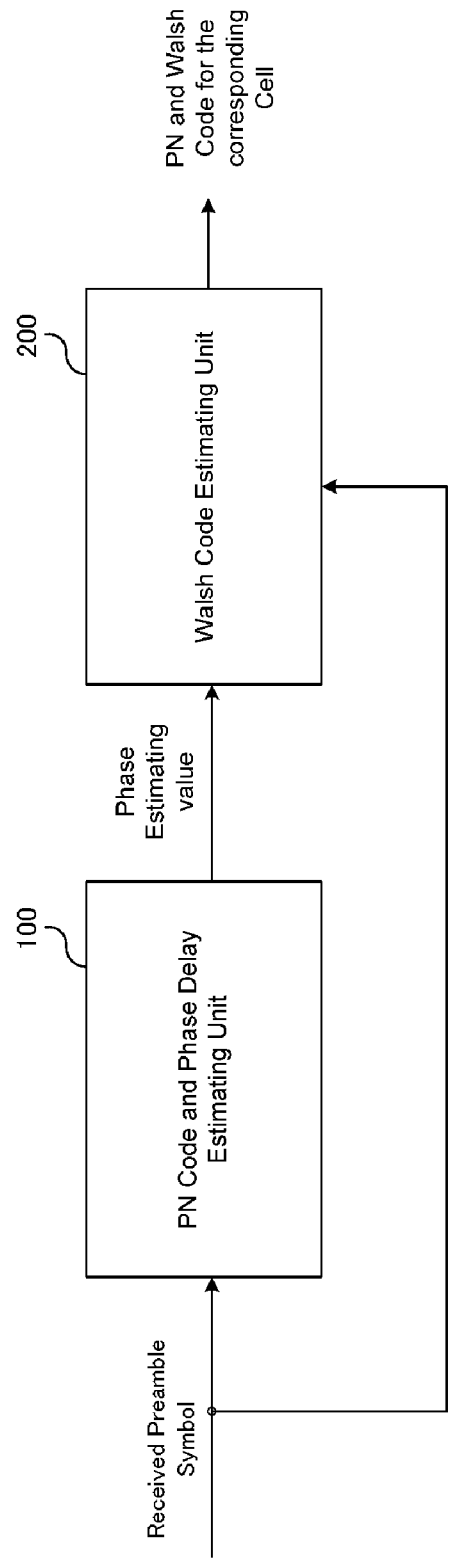

[Fig. 2]
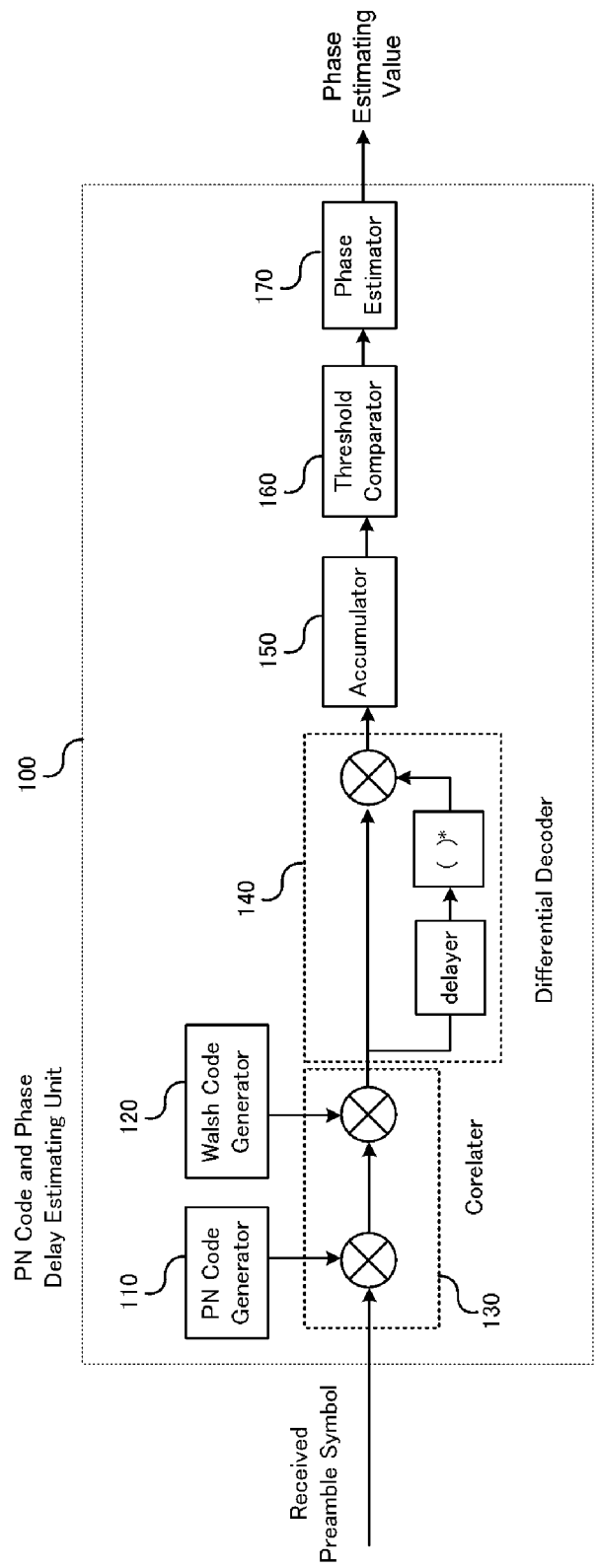

[Fig. 3]
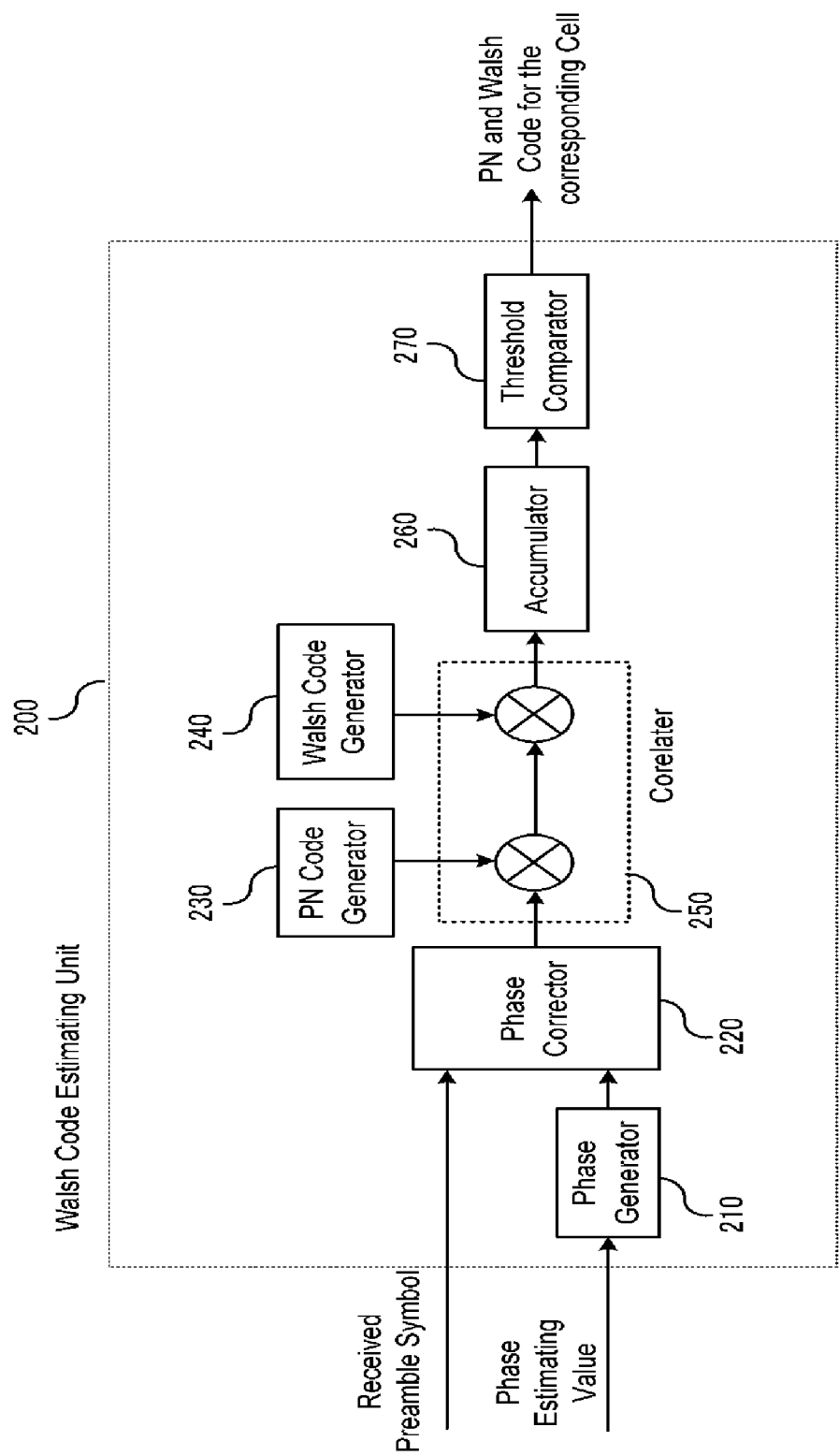

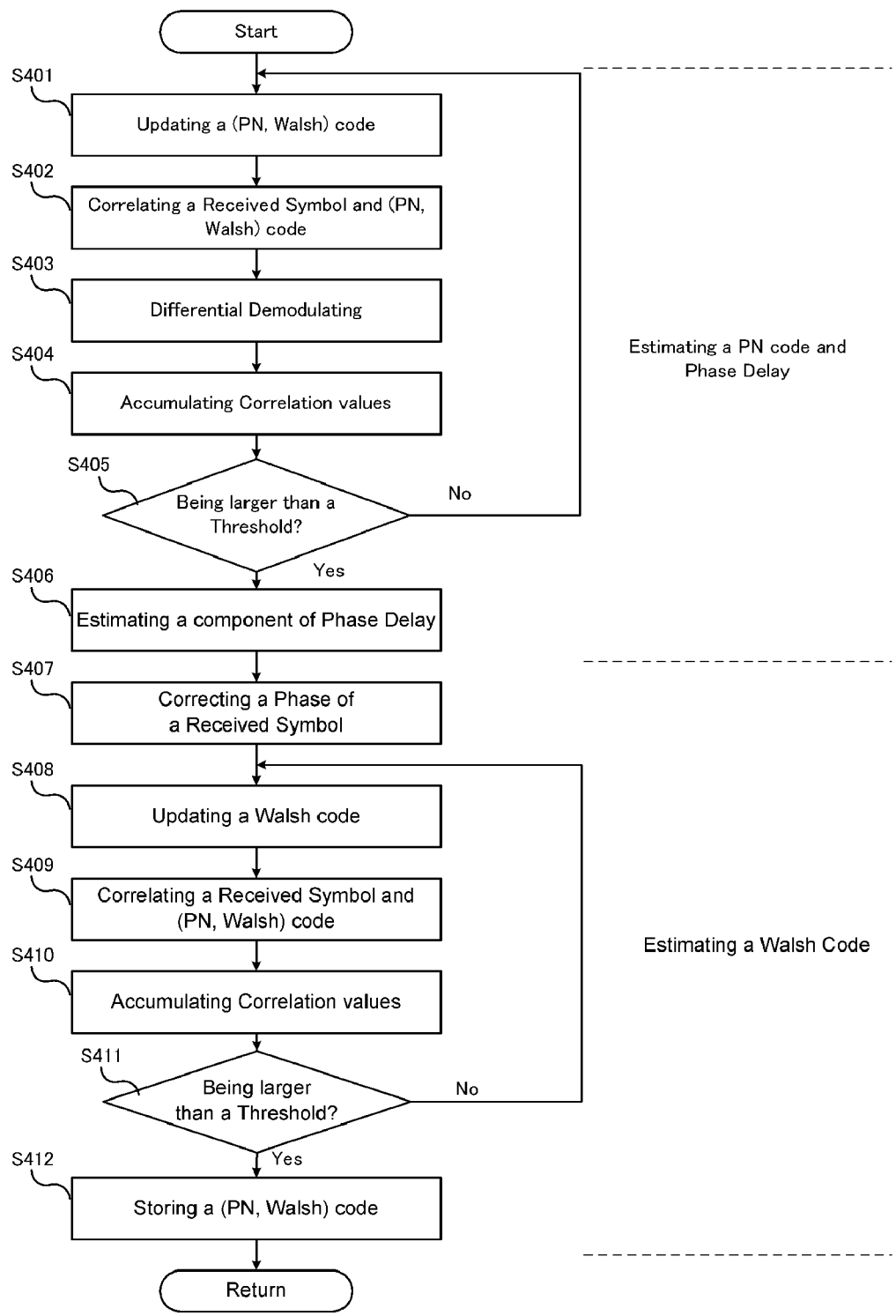
[Fig. 4]

CELL SEARCH DEVICE OF CELLULAR SYSTEM USING OFDMA SCHEME AND METHOD THEREOF

TECHNICAL FIELD

The present invention relates to a cell search device of a cellular system using an orthogonal frequency division multiplexing access scheme, and a method thereof. More particularly, the present invention relates to a cell search device using an appropriate preamble for a downlink of a cellular system using an orthogonal frequency division multiplexing access (OFDMA) scheme, and a method thereof.

BACKGROUND ART

Generally, a terminal must be capable of performing a cell search according to a signal received from a base station in a cellular system. In order to perform a cell search, a GSM which is a cellular system of a conventional time division multiple access (TDMA) scheme, or an IS-95, a CDMA-2000, or a W-CDMA scheme, etc., which are cellular systems using conventional code division multiple access (CDMA), are provided with a downlink.

Conventional OFDMA-based systems include digital audio broadcasting (DAB), digital video broadcasting (DVB), IEEE802.11a, and HiperLAN/2 standards. These conventional OFDMA-based systems are not cellular systems so it is difficult to perform synchronization and a cell search with a conventional structure.

A scheme for supporting the OFDMA-based cellular system using two preamble symbols has been developed at IEEE802.16e.

At the two preamble symbols, a first preamble signal is used for time synchronization and frequency synchronization with a PN code which all cells commonly use, and a second preamble signal is used for a cell search by forming a correlation between the PN codes and all the cells since a signal is broadcasted using different PN codes for the respective cells. However, with these two preamble symbols, there is a problem in that an effective period, which is used for real data at one frame, is wasted.

Meanwhile, Korean Patent Application No. 1999-57310 (Dec. 13, 1999) entitled "Cell search method in a mobile communication system" discloses a method for efficiently performing a cell search in a code division multiple access system of a third generation mobile communication system using an IMT-2000 standard.

In the mobile communication system according to the prior art, the cell search method includes selecting a number N of minimal slots having a large correlation value (or considering a terminal performance and a channel environment) from among a total of 20 minimal slots at one arbitrary slot period so as to not repeatedly calculate; calculating variables for determining the selected minimal slots; and extracting more reliable minimal slots for performing a next cell search by repeatedly accumulating the same slot periods so as to optimize an extracting method of the minimal slot periods, wherein the same slot periods have a characteristic repeated for the respective frames.

US Patent Application No. 2003/0095516A1 (Mar. 22, 2003) entitled "Cell Search device and method in a mobile communication system" discloses a cell search device and method for efficiently performing a multipath and cell search in a code division multiple access system of a third generation mobile communication system using a UMTS scheme.

In the mobile communication system according to the prior art, the cell search method includes matching slot border timing and frame border timing with that of a base station, obtaining PN code timing and ending an initial cell search; searching a first area based on the PN code timing detected at the initial cell search to perform a multipath search; and then searching a second area based on the more previously obtained PN timing rather than performing a reacquisition at a slip state in which a second area is larger than a first area; and performing an adjacent cell search by selectively using the initial cell search and the multipath search according to an amount and types of information provided from the base station. Accordingly, in the UMTS scheme, a mobile station does not use the three-step cell search of the initial cell search state but only uses an predetermined area of PN code timing at the initial cell search to rapidly accomplish a cell search.

According to the prior art, the OFDMA-based cellular system can increase the effective period for the real data at one frame by using only a preamble symbol configured as a combination of different PN codes for the respective cells and a Walsh code. However, the OFDMA-based cellular system must be capable of performing time synchronization, frequency synchronization, and cell search at one preamble.

Since the preamble is configured by different PN codes for the respective cells, system performance is decreased due to a phase delay occurred by an error of the time synchronization.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a cell search device of a cellular system using an orthogonal frequency division multiplexing access scheme and a method thereof, having advantages of efficiently searching a preamble sequence of a downlink for identifying a cell by combining a PN code with a Walsh code.

Technical Solution

An exemplary cell search device according to an embodiment of the present invention includes, in a terminal of a cellular system using an orthogonal frequency division multiplexing access scheme, when the terminal receives a preamble symbol from a base station, a PN code and phase delay estimating unit for generating a code with the received preamble symbol and a combination of a PN code and a Walsh code, calculating a correlation value therebetween using differential demodulation for the codes to detect the PN code, a plurality of Walsh codes, and a time delay error, and estimating a component of a phase delay for the time delay; and a Walsh code estimating unit for minimizing the influence of the time delay error using the phase delay and the PN code information obtained by the differential demodulation of the PN code and phase delay estimating unit, and estimating a Walsh code for the corresponding cell by synchronization demodulation.

An exemplary cell search method according to an embodiment of the present invention includes, in a terminal of a cellular system using an orthogonal frequency division multiplexing access scheme, a) updating a first combination of PN code and Walsh code so as to estimate the corresponding PN code and phase delay;

b) calculating a cross-correlation using a sequence with the received preamble symbol and the first combination of PN code and Walsh code in the frequency domain;

c) performing a differential demodulation for the correlation value;

d) accumulating the correlation values and comparing the accumulated values with a threshold value;

e) estimating the fixed component of the phase delay when the correlation value is larger than the threshold value;

f) correcting the received symbol phase using the phase estimating value obtained at e) and updating the Walsh code;

g) calculating a correlation value again using a sequence with the received preamble symbol and the combination of PN code and Walsh code at the frequency domain;

h) accumulating the correlation values and comparing the accumulated value with a given threshold value; and i) detecting a larger Walsh code than the threshold value to obtain a PN code and Walsh code combination for the specified cell.

BRIEF DESCRIPTION OF THE DRAWINGS

FIG. 1 is a schematic diagram of a cell search device according to an exemplary embodiment of the present invention.

FIG. 2 is a block diagram for estimating a corresponding PN code and phase delay in a cell search device according to an exemplary embodiment of the present invention.

FIG. 3 is a block diagram for estimating a corresponding Walsh code in a cell search device according to an exemplary embodiment of the present invention.

FIG. 4 is a flowchart showing a cell search method according to an exemplary embodiment of the present invention.

BEST MODE FOR CARRYING OUT THE INVENTION

An embodiment of the present invention will hereinafter be described in detail with reference to the accompanying drawings.

FIG. 1 is a schematic diagram of a cell search device according to an exemplary embodiment of the present invention.

According to an exemplary embodiment of the present invention, as shown FIG. 1, a cell search device of a cellular system using an OFDMA scheme includes a PN code and phase delay estimating unit 100 and a Walsh code estimating unit 200.

The PN code and phase delay estimating unit 100 obtains a phase estimating value according to a received preamble symbol, and the Walsh code estimating unit 200 obtains a PN code and a Walsh code of the corresponding cell using the phase estimating value.

In detail, the PN code and phase delay estimating unit 100 performs a correction calculation using differential demodulation and detects a PN code, a plurality of Walsh codes, and a time delay error so as to minimize an influence of a time error occurring during initial synchronization of a terminal receiver.

The Walsh code estimating unit 200 minimizes the influence of the time error using the time delay and PN code information obtained at the differential demodulation, and performs the synchronization demodulation to estimate the Walsh code of the corresponding cell so as to minimize a loss of cross-orthogonality of the Walsh code occurring by the differential demodulation of the PN code and phase delay estimating unit 100.

In this embodiment, when the preamble is generated using a combination of the PN code and Walsh code and is transmitted to identify a cell at the base station of the cellular system using the OFDMA scheme, the terminal receiver can search the corresponding cell using a correlation of the combination of the PN code and Walsh code in the frequency domain so as to obtain the corresponding cell information.

FIG. 2 is a block diagram for estimating the corresponding PN code and phase delay in a cell search device according to an exemplary embodiment of the present invention.

Referring to FIG. 2, the PN code and phase delay estimating unit 100 includes a PN code generator 110 for generating the PN code, a Walsh code generator 120 for generating the Walsh code, a corelater 130 for calculating a correlation value of the received preamble symbol, the PN code, and the Walsh code, a differential demodulator 140 for performing differential demodulation, an accumulator 150 for accumulating the correlation values, a comparator 160 for comparing the accumulated correlation value with a threshold value, and a phase estimator 170 for estimating a phase delay from a larger differential demodulation value than the threshold value.

The PN code and phase delay estimating unit 100 generates a first code with the received preamble symbol and the combination of the PN and Walsh code to calculate the correlation value.

That is, when the terminal receives the preamble symbol from the base station, in the PN code and phase delay estimating unit 100 the PN code generator 110 generates the PN code, the Walsh code generator 120 generates the Walsh code so that a first code is generated with the combination of the PN code and Walsh code and the received preamble symbol, and thereafter the corelater 130 calculates the correlation value thereof.

In this case, the received preamble symbol includes a component of the phase delay occurred by the error of the time synchronization. Accordingly, the differential demodulator 140 performs the differential demodulation so as to overcome the component of the phase delay. The differential demodulator 140 complex-conjugates the current value and the previous value among the correlation values and multiplies the complex conjugate values.

Through such differential demodulation, the accumulator 150 accumulates the correlation values and the comparator 160 compares the accumulated value of the correlation values with the threshold value to estimate the corresponding PN code.

Thereafter, the phase estimator 170 estimates the phase delay from the larger differential demodulation value than the threshold value.

That is, the PN code preserves a cross-correlation characteristic generated by the differential demodulation, while the Walsh code loses cross-orthogonality so that a plurality of Walsh codes are detected.

In order to compensate for a loss of the cross-orthogonality of the Walsh code, a phase estimating value is estimated from the combination of the estimated PN code and the Walsh code and is synchronized/demodulated, and then the corresponding Walsh code is detected as shown in FIG. 3.

FIG. 3 is a block diagram for estimating the corresponding Walsh code in a cell search device according to an exemplary embodiment of the present invention.

Referring to FIG. 3, the Walsh code estimating unit 200 includes a phase generator 210 for generating a phase from the phase estimating value estimated from the PN code and phase delay estimating unit 100, a phase corrector 220 for correcting the phase delay of the received preamble symbol, a PN code generator 230 for generating the PN code, a Walsh code generator 240 for generating the Walsh code, a corelater 250 for calculating correlation values of the corrected preamble symbol, PN code, and Walsh code, an accumulator 260 for accumulating the correlation values, and a comparator 270 for comparing the accumulated value with the threshold value.

According to an exemplary embodiment of the present invention, in the Walsh code estimating unit 200, the phase generator 210 generates a phase using the phase estimating value detected in FIG. 2, and the phase corrector 220 corrects the phase delay using the received preamble symbol. The PN code generator, the Walsh code generator 240, the corelater 250, the accumulator 260, and the comparator 270 perform the same functions as the above-described constituent elements of the differential demodulator of FIG. 2, with the exception of the differential demodulator.

That is, the correlations are given for the Walsh codes using the pre-estimated PN code according to the block diagram of FIG. 2. In this case, the corrected preamble symbol for the phase delay is also corrected for the error of the time synchronization so that the cross-orthogonality is preserved for the received preamble symbol. Lastly, the accumulated value of the correlation values is compared with the threshold value to detect the corresponding Walsh code. As a result, the combination of PN code and Walsh code is obtained for the specified cell.

FIG. 4 is a flowchart showing a cell search method according to an exemplary embodiment of the present invention, wherein the cell is searched using a time-synchronized preamble symbol at the frequency domain.

Referring to FIG. 4, in the cell search method, the PN code and phase delay are estimated through steps S401 to S406, and then the Walsh code is estimated through steps S407 to S412.

First, in order to estimate the corresponding PN code and phase delay, a first combination of PN code and Walsh code is updated (S401), and a cross-correlation is calculated using a sequence with the received preamble symbol and the first combination of PN code and Walsh code in the frequency domain (S402).

In this case, since the received preamble symbol is roughly synchronized using the preamble with the combination of PN code and Walsh code, the preamble symbols respectively have different components of the phase delay according to orders of the sample at the frequency domain. In order to overcome different components of the phase delay, the correlation values are differentially demodulated (S403) so that the different components are converted into a fixed component of the phase delay.

Next, the correlation values are accumulated (S404) and the accumulated values are compared with the threshold value (S405). In this case, when the accumulated value is less than the threshold value, it is turned back to the above-described steps S401 and S402 so that the combination of PN code and Walsh code is updated and the correlation is again calculated.

When the correlation value is larger than the threshold value, the fixed component of the phase delay is estimated (S406). By estimating the component of the phase delay in this manner, the loss of the cross-orthogonality cannot occur by the differential demodulation between the Walsh codes, so the correct Walsh code is estimated for the corresponding cell.

Now, in order to estimate the corresponding Walsh code, the phase of the received symbol is corrected using the phase estimating value obtained at step S406 (S407) and the Walsh code is updated (S408).

Consecutively, the correlation values are again calculated using the sequence with the received preamble symbol and the combination of PN code and Walsh code in the frequency domain (S409).

The correlation values are accumulated so as to overcome the different components of the phase delay (S410), and the accumulated value is compared with the threshold value (S411). In this case, when the accumulated value is less than the threshold value, it is turned back to the above-described steps S408 and S409 so that the combination of PN code and Walsh code is updated and the correlation is again calculated.

That is, when the component of the phase delay of the received preamble symbol is corrected using the value obtained at the above-described step S406 (S407), the component is synchronized/demodulated without the differential demodulation to preserve the cross orthogonality of the Walsh code.

Ultimately, by storing the PN code and Walsh code, all combinations of the Walsh code and the component of the phase delay are corrected for the received preamble symbol which can be used to exactly search the PN code and the Walsh code for the corresponding cell (S412).

INDUSTRIAL APPLICABILITY

According to an exemplary embodiment of the present invention, when the preamble is generated using the combination of the PN code and Walsh code preamble and transmitted so as to identify cells in a base station of a cellular system using the OFDMA scheme, the terminal receiver searches the corresponding cell using the correlation value of the combination of the PN and Walsh code in the frequency domain so as to obtain information of the corresponding cell.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to an exemplary embodiment of the present invention, when the terminal searches a cell using the combination of the PN code and Walsh code in the cellular OFDMA scheme, the cell is efficiently searched by sequentially combining the PN and Walsh codes regardless of the error of the time synchronization generated due to the initial synchronization, so the performance is enhanced.

The invention claimed is:

1. A cell search device for a terminal of a cellular system using an orthogonal frequency division multiplexing access scheme, comprising:
 a PN code and phase delay estimating unit for calculating first correlation values of a received preamble symbol from a base station to the terminal with combination of a PN code and a Walsh code, for performing differential demodulation for the first correlation values to generate differential demodulation values, and for estimating a phase delay from the differential-demodulated values to generate an estimated phase delay value; and
 a Walsh code estimating unit for correcting phase delay of the received preamble symbol by using a phase derived from the estimated phase delay value, for calculating second correlation values of a corrected received preamble symbol with combination of a PN code and a Walsh code, and for estimating a Walsh code for the corresponding cell by using the second correlation values.

2. The cell search device of claim 1, wherein the PN code and phase delay estimating unit performs a differential demodulation for the first correlation values so as to overcome respective different components of the phase delay according to orders of the sample of the preamble symbols in the frequency domain.

3. The cell search device of claim 1, wherein the PN code and phase delay estimating unit includes:
a PN code generator for generating the PN code;
a Walsh code generator for generating the Walsh code;
a correlator for calculating the first correlation values of the received preamble symbol with combination of the PN code and the Walsh code;
a differential demodulator for performing a differential demodulation for the first correlation values to generate differential-demodulated values;
an accumulator for accumulating differential-demodulated values to generate an accumulated value;
a comparator for comparing the accumulated value with a threshold value; and
a phase estimator for estimating the phase delay from a larger differential demodulation value than the threshold value to generate the estimated phase delay value.

4. The cell search device of claim 3, wherein the differential demodulator complex-conjugates the current value and the previous value among the first correlation values, and multiplies the complex conjugate values.

5. The cell search device of claim 1, wherein the Walsh code estimating unit includes:
a phase generator for generating a phase from the estimated phase delay value estimated from the PN code and phase delay estimating unit;
a phase corrector for correcting the phase delay of the received preamble symbol by using the phase to generate a corrected received preamble symbol;
a PN code generator for generating the PN code;
a Walsh code generator for generating the Walsh code;
a correlator for calculating second correlation values of the corrected received preamble symbol with combination of the PN code and the Walsh code;
an accumulator for accumulating the second correlation values to generate an accumulated value; and
a comparator for comparing the accumulated value and the threshold value to estimate the Walsh code for the corresponding cell.

6. A cell search method for a terminal of a cellular system using an orthogonal frequency division multiplexing access scheme comprising:
a) updating a first combination of PN code and Walsh code so as to estimate the corresponding PN code and phase delay;
b) calculating a cross-correlation using a sequence with the received preamble symbol and the first combination of PN code and Walsh code in a frequency domain;
c) performing a differential demodulation for the correlation value;
d) accumulating the correlation values and comparing the accumulated values with a threshold value;
e) estimating the fixed component of the phase delay when the correlation value is larger than the threshold value;
f) correcting the received symbol phase using the phase estimating value obtained at e) and updating the Walsh code;
g) calculating a correlation value again using a sequence with the received preamble symbol and the combination of PN code and Walsh code in the frequency domain;
h) accumulating the correlation values and comparing the accumulated value with a given threshold value; and
i) detecting a larger Walsh code than the threshold value to obtain a combination of the PN code and Walsh code for the specified cell.

7. The cell search method of claim 6, wherein it is turned back to the above a) step when the accumulated value is less than the threshold value at d), and the combination of PN code and Walsh code is updated and the correlation value is again calculated.

8. The cell search method of claim 6, wherein at step e), a cross orthogonality is preserved for the Walsh code without the differential demodulation when the component of the phase delay is corrected for the received preamble symbol using the phase delay estimating value.

9. The cell search method of claim 6, wherein it is turned back to the above step f) when the accumulated value is less than the threshold value at step h), and the Walsh code is updated and the correlation value is again calculated.

* * * * *